UNITED STATES PATENT OFFICE.

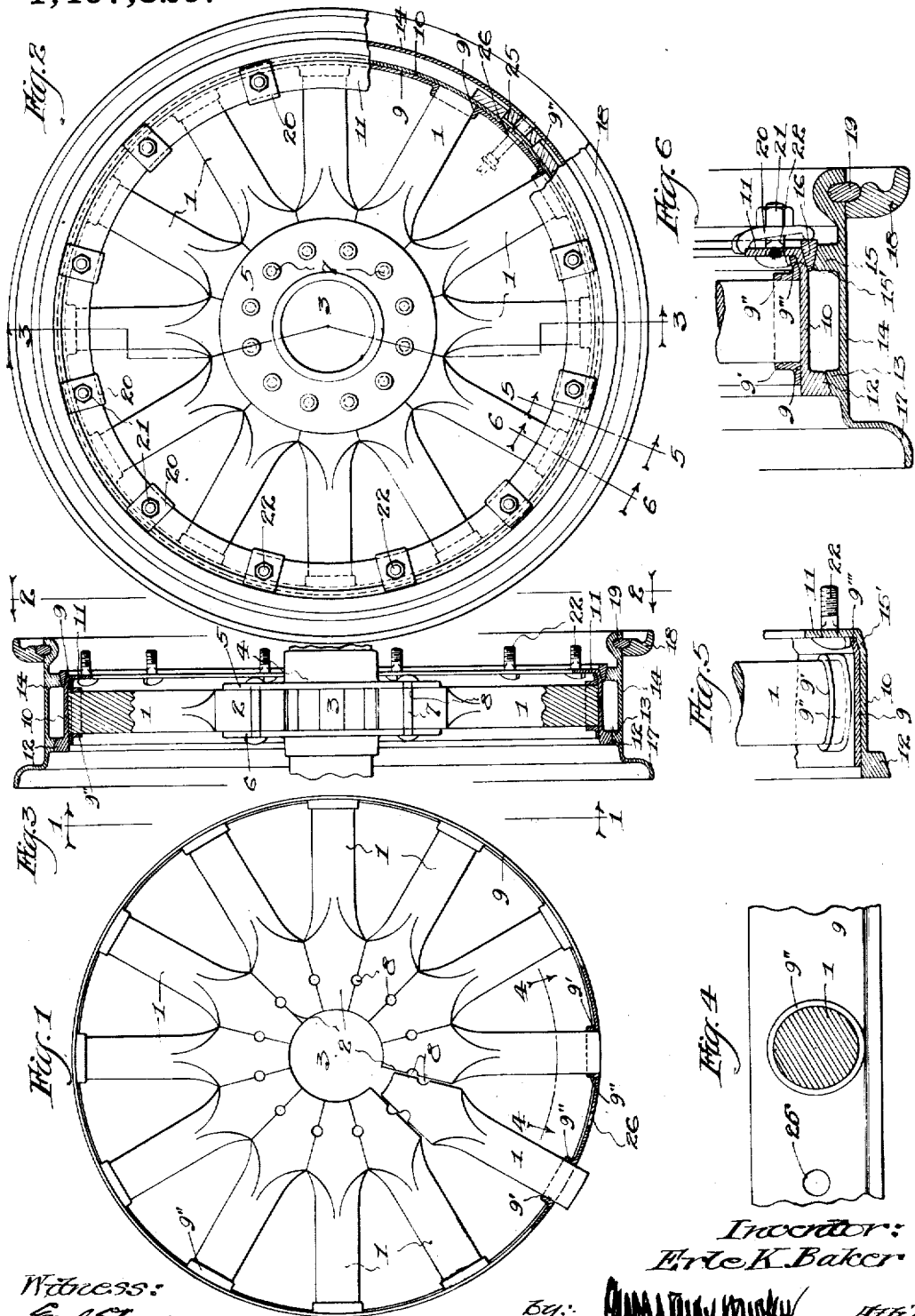

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

SEMIWOOD WHEEL FOR MOTOR TRUCKS.

1,407,829.  Specification of Letters Patent.  Patented Feb. 28, 1922.

Application filed January 15, 1919. Serial No. 271,224.

*To all whom it may concern:*

Be it known that I, ERLE K. BAKER, a citizen of the United States, and a resident of Chicago, county of Cook, and State of Illinois, have invented certain new and useful Improvements in Semiwood Wheels for Motor Trucks, of which the following is a specification.

My invention relates to improvements in automobile wheels of the type adapted to carry either fixed or demountable pneumatic tire rims, and relates more particularly to wheels of a type adapted to the carrying of great loads, such as are met with in motor-truck practice.

While wheels of both metal and wood have been used in motor-truck practice, it is quite generally admitted that the wooden wheel has certain advantages that are not to be found in the all-metal wheel. One such desirable feature found in the wooden wheel is that of greater resiliency and the consequent smaller transmission of destructive forces to the axle and other parts of the vehicle. Resiliency in a motor truck wheel is particularly necessary where the wheel is provided with a hard or solid rubber tire, because of the excessive vibration which such tire entails. However, it is also quite necessary and desirable, even with the later practice of using large pneumatic tires on motor truck wheels for the reason that the tendency, when using a pneumatic tire, is to operate the vehicle at such an increased rate of speed that the vibration and destructive forces set up, and which must be absorbed to prevent undue injury to the vehicle, are about the same as with a solid-tired wheel.

The prevailing type of wooden wheel is composed of a plurality of wooden spokes radiating from a hub portion outwardly, the ends of the spokes being reduced and tenoned in a heavy wooden felly. The wooden felly, heretofore necessary, must be made of high-grade wood, such as is susceptible of being bent into an arc, constituting a segment of the wheel. Not only is such felly wood scarce, but it is also quite difficult to bend and shape and the operation of making the wheel, as heretofore practiced, requires a workman having a relatively high degree of skill.

In order to secure the requisite strength for motor trucks of large capacity the practice has developed of reducing the size of the wheel. This reduction in the size of the wheel, while providing greater rigidity necessarily has a complementary disadvantage in that it destroys in a large measure the highly desirable resilient features of the wooden wheel. Resiliency is further minimized in the smaller sizes of wheels by the relatively large proportion of the felly to the entire wheel.

Those motor wheels designed for pneumatic tires are smaller in proportion to the size of the pneumatic tire employed. That is to say, the larger the size of the tire the smaller the diameter of the wooden wheel and hence the less resiliency in the wheel.

If it be attempted to secure the requisite resiliency in the wood wheel by providing relatively long spokes, even assuming that other factors do not prohibit such a design, another difficulty is at once encountered. That is to say, while a short spoke composed of an ordinary grade of wood furnishes the requisite strength, a long spoke would require a very high grade of wood, so much so that it would have to be selected stock, which would add greatly to the cost of the wheel.

One of the difficulties that develops in the use of the wooden wheel as heretofore made, is that of looseness between the parts, usually between the spokes and the felly. So soon as a slight looseness develops, vibrations are set up which, in a short time, grow to such proportions as to be quickly and violently destructive of the whole wheel.

The general object of my invention is to provide a motor-truck wheel abundantly able to withstand the forces to which it is subjected in use and yet of such a resilient character as to be of practical assistance in absorbing road shocks.

A further object of my invention is to provide a motor-truck wheel of a strong but resilient character, which shall be especially adapted to the carrying of a pneumatic tire.

Again it is an object of my invention to provide a motor truck wheel of such construction that the hitherto individualistic and highly-skilled manufacture and assembly of each wheel can be reduced to a factory system in which the spokes can be manufactured in a convenient, simple, and rapid manner, and thereafter easily assembled, by unskilled labor, with the other parts necessary to provide a strong and durable, yet resilient, wheel.

A detailed object of the present invention is to provide a motor-truck wheel, and a method of manufacturing the same, which shall be adapted to embodiment in a so-called wide rim wheel, such as is commonly found in pneumatically tired truck wheels.

My invention consists generally in a motor truck wheel, and in the method of producing the same, whereby the above named objects and purposes, together with a number of others that will appear hereinafter, are attained; and my invention will be more readily understood by reference to the drawings, wherein I have adapted what I now consider to be the preferred embodiment thereof, but which, it should be understood, is by way of illustration and not by of limitation.

In the drawings: Figure 1 is a side elevation of a wheel embodying my invention, the same being viewed substantially along the line 1—1 of Fig. 3:—(the fixed rim and demountable rim being omitted.) Fig. 2 is a side elevation viewed substantially along the line 2—2 of Fig. 3:—Fig. 3 is a section taken on the line 3—3 of Fig. 2;—Fig. 4 is an enlarged detail view substantially on the line 4—4 of Fig. 1:—Fig. 5 is a detail view on the line 5—5 of Fig. 2:—(the demountable rim being omitted.) Fig. 6 is an enlarged view on line 6—6 of Fig. 2.

Referring to the drawings, and particularly to Fig. 1 it will be observed that the body of the wheel comprises a plurality of wooden spokes, 1, having mitered ends, 2, adapted to be tightly wedged together and thereby defining the hub hole 3. The method of assembling the spokes will be described hereinafter. To the hub of the wooden part may be secured the metallic hub, 4, of usual construction. The metallic hub, 4, is provided with a flange, 5, on one side and upon the opposite side will be found a slip-flange, 6. The metallic hub parts are rigidly secured to the hub of the wheel, i. e., that portion formed by the portion, 2, of the spokes by means of suitable bolts, 7, passing through holes, 8. I find that twelve spokes, as here shown, is a number well adapted to the average truck wheel. It is a number large enough to provide ample strength, even where the wood is not of the most select grade, it spaces the spoke ends apart a distance sufficient to accommodate the valve stem of the pneumatic tire in an easily accessible manner and it provides a sufficient number of supports for the fixed rim (hereinafter described) to eliminate any danger of polygonizing same when it is shrunk upon a relatively thin peripheral band.

As will be observed, I have entirely eliminated the old form of wooden felly with its expensive, short-lived mortise and tenoned connection with the spoke ends. Instead I employ a metal band, 9, which as a matter of convenience, I shall term a "spacing band."

The fixed rim, 10, is preferably formed by bending a flat metal strip, having a flange on one edge, and a rim seat upon the other, into circular shape, so that the flange extends inwardly and the rim seat faces outwardly. The fixed rim may be formed of various cross-sections by well-known rolling processes, after which the rolled metal may be cut into desired lengths, shaped to cylindrical form, and the ends joined as by welding. When completed it presents an inwardly extending flange, 11, and an outward or peripheral seat portion, 12, upon which may be seated the tire rim, 14, by the coaction of beveled portions, 13 and 15, thereof, with the beveled portion, 12, of the fixed rim and the beveled wedge ring, 16. It will be understood that the tire-containing rim is of the so-called demountable construction in which the rim, 14, is seated by the movement axially of the wheel. The pneumatic tire (not shown) is held in place on the rim, 14, by means of the integral flange, 17, at one side and the detachable flange, 18, at the other side, the detachable flange being held in place by the split ring, 19. Since these parts are of well-known construction, their various functions will not be dwelt upon. The demountable rim lugs, 20, are actuated by means of the nuts, 21, and bolts, 22, the latter being carried in the inwardly extending flange, 11, of the fixed rim, 10.

The spacing band is preferably formed by bending a flat metal strip into circular shape and then joining the ends as by welding. The peripheral band is substantially cylindrical in shape but is provided at spaced points with sockets, 9', of a size slightly smaller than the outer end of the wooden spoke and in such spaced relation that they are in line with the radiating spokes. The sockets, 9', as shown, are formed by punching the metal of the spacing band inward thereby forming a circular flange, 9'', which embraces the spoke end for a considerable distance.

In order to facilitate assembly of the spokes, I may slightly compress the ends thereof so that they may be moved radially outward. This permits the end of the spoke to project through the socket, 9', as is well shown in Fig. 1, and then forced radially inward into the position desired. The reduction of the spoke end is only temporary as after compression the spoke soon swells out thus forming a tight and firm union between the spoke end and the socket. As the socket in this instance is metallic, there is little change in size and hence that objectionable looseness so often found in the mortised and tenoned construction of wooden spokes and felly wheels is obviated. The assembly of the spokes and spacing band is well shown in Fig. 1. This unit alone is of great strength and when combined with the fixed rim about to be described is further strengthened and made abundantly able to withstand any and all forces to which it is subjected in use.

The fixed rim is firmly secured upon the spacing band, so that when in place the union is of such strength that relative movement is prevented. This union may be secured in various ways, as for example, by forcing the spacing band and spokes carried thereby into the fixed rim by means of strong lateral pressure. Or the union may be made by heating the fixed rim, slipping it over the spacing band and allowing it to shrink into place. It should be noted that the spacing band, 9, is provided with a conical flange, 9''', at one side in order that it may conform to the conical flange, 15', of the fixed rim.

The fixed rim is provided with a hole, 25, and the spacing band with a hole, 26, which in assembly are aligned and which accommodate the valve stem of the pneumatic tire (not shown).

I desire to call attention to another function served by the spacing band, 9, in addition to spacing the wheel spokes, and that is that the fixed rim in being tensioned upon the spokes is supported, in a measure intermediate the spoke ends by the spacing band and thus all danger of polygonizing the fixed rim, in shrinking is avoided.

Obviously by dispensing with the sectional wooden felly as I do, there are fewer parts in the assembled wheel and hence fewer joints that can loosen and cause trouble.

Furthermore by eliminating the wooden felly, I am enabled to provide a relatively large wooden hub portion in the wheel, such as will give the requisite strength even for motor trucks of large capacity. At the same time I provide a projecting spoke of a length sufficient to be actually resilient, even where the wheel, as a whole, is of relatively small diameter, such as is the case when employed in conjunction with a giant pneumatic tire. I thus not only provide a strong, yet resilient wheel, but I also provide one in which the spoke portions projecting from the hub are not of undue length and can, therefore, be made of ordinary wood and yet be of requisite strength.

In a companion application, S. N. 274,325, filed January 31, 1919, I have presented a similar structure differing herefrom in particulars which identify the invention with wheels that embody so-called solid rubber tires. A cross reference to this application has been placed in application S. N. 271,224.

I claim—

1. A semi-wood motor vehicle wheel, comprising a plurality of radial wooden spokes, having mutually coactive mitered butts, in combination with a spoke spacing and spoke holding metal band tightly embracing the ends of the spokes, and a fixed rim firmly tensioned upon said spacing band and the ends of said wooden spokes, and sealing the end-grain of the wooden spokes.

2. A semi-wood motor vehicle wheel, comprising a plurality of radial wooden spokes, having mutually coacting mitered butts, in combination with a spoke spacing and spoke holding metal band tightly embracing the ends of the spokes, a fixed rim firmly tensioned upon said spacing band and the ends of said wooden spokes and sealing the end-grain of the wooden spokes, said fixed rim being formed to receive a demountable rim, and means attached to said fixed rim for securing a demountable rim thereon.

3. The step in the method of producing a semi-wood wheel that consists in providing a plurality of wooden billets, mitering the billets at one end, providing a fixed rim having spoke-end receiving sockets of a size slightly smaller than the outer ends of the spokes, and slightly compressing the outer ends of the spokes to permit the positioning thereof in said sockets, and afterward permitting said spoke ends to swell and thus rightly fit their sockets.

In testimony whereof, I have hereunto set my hand this 6th day of January, 1919.

ERLE KING BAKER.